(12) United States Patent
Tanner

(10) Patent No.: US 7,784,166 B2
(45) Date of Patent: Aug. 31, 2010

(54) COUPLING DEVICE

(75) Inventor: Peter Tanner, Bubendorf (CH)

(73) Assignee: Synthes USA, LLC, West Chester, PA (US)

( * ) Notice: Subject to any disclaimer, the term of this patent is extended or adjusted under 35 U.S.C. 154(b) by 644 days.

(21) Appl. No.: 11/453,583

(22) Filed: Jun. 14, 2006

(65) Prior Publication Data
US 2006/0282108 A1 Dec. 14, 2006

Related U.S. Application Data

(63) Continuation of application No. PCT/CH03/00816, filed on Dec. 15, 2003.

(51) Int. Cl.
*B23B 31/10* (2006.01)
*B23B 51/08* (2006.01)
(52) U.S. Cl. .................. 29/525.02; 29/50; 279/137; 279/905; 408/26; 30/166.3; 83/698.11; 606/82; 606/176
(58) Field of Classification Search .............. 279/137, 279/143, 905; 408/25, 36, 42, 26, 28, 204, 408/703; 29/40, 50, 565, 525.02; 409/73; 30/166.3, 337, 392; 83/698.11, 698.71, 699.21, 83/699.51; 606/79, 82, 176–179; *B23B 31/10, B23B 51/08*
See application file for complete search history.

(56) References Cited

U.S. PATENT DOCUMENTS

| 2,303,565 | A | * | 12/1942 | Luna ..................... 173/214 |
| 3,880,546 | A | * | 4/1975 | Segal ..................... 408/204 |
| 4,077,737 | A | * | 3/1978 | Morse .................... 408/206 |
| 4,206,821 | A | * | 6/1980 | Emmerich ............... 175/321 |
| 4,234,277 | A | * | 11/1980 | Benson et al. ........... 408/226 |
| 4,386,609 | A | * | 6/1983 | Mongeon ................ 606/53 |
| 5,122,142 | A | * | 6/1992 | Pascaloff ................ 606/82 |
| 5,607,266 | A | * | 3/1997 | Anderson ............... 408/124 |
| 5,702,415 | A | | 12/1997 | Matthai et al. |
| 5,839,196 | A | | 11/1998 | Trott |
| 5,967,709 | A | * | 10/1999 | Thuesen ................ 408/204 |
| 6,113,618 | A | * | 9/2000 | Nic ....................... 606/176 |
| 6,705,807 | B1 | * | 3/2004 | Rudolph et al. ......... 408/1 R |
| 6,949,110 | B2 | | 9/2005 | Ark et al. |
| 7,073,992 | B2 | * | 7/2006 | Korb et al. .............. 408/204 |

FOREIGN PATENT DOCUMENTS

| DE | 221 385 A | 4/1985 |
| EP | 1 193 014 | 4/2002 |
| FR | 2 255 814 A | 7/1975 |
| JP | 2002-137111 | 12/2002 |
| WO | WO 0138028 A1 * | 5/2001 |

* cited by examiner

*Primary Examiner*—Eric A Gates
(74) *Attorney, Agent, or Firm*—Fay Kaplun & Marcin, LLP

(57) ABSTRACT

A coupling device for connecting tools with different configuration to a driving mechanism. The coupling device may have a longitudinal axis, a first clamping device which may engage a tool with a peg-shaped clamping segment and a second clamping device which may engage a tool with a generally flat portion. The coupling device may be used to connect a tool to a drive shaft which may be attached to a motor. The tools may be locked or unlocked relative to the coupling device by sliding a sleeve along the axis of the coupling device. The sleeve may be biased in a locked position by biasing means such as a spring. The coupling device may be configured so that the first and second tool may be prevented from rotating and/or moving axially with respect to the drive shaft.

29 Claims, 4 Drawing Sheets

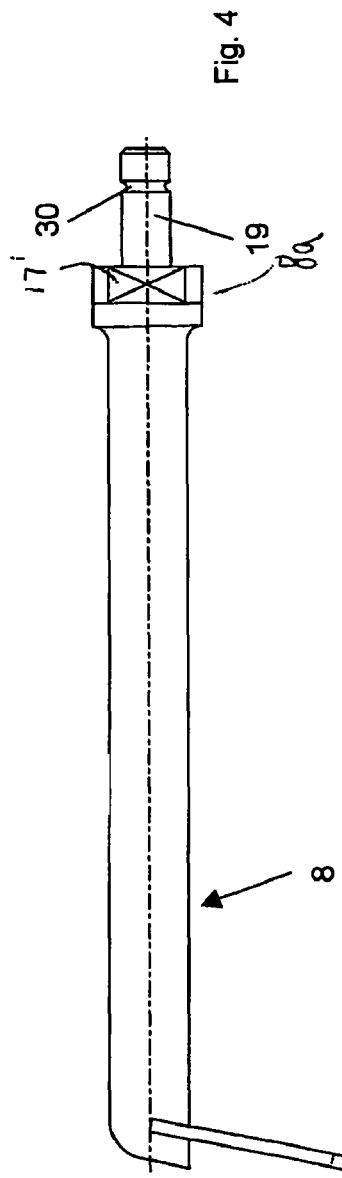
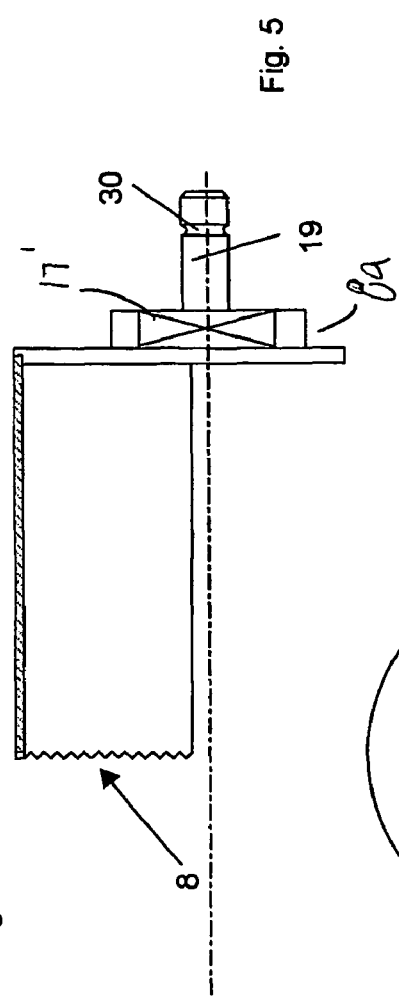
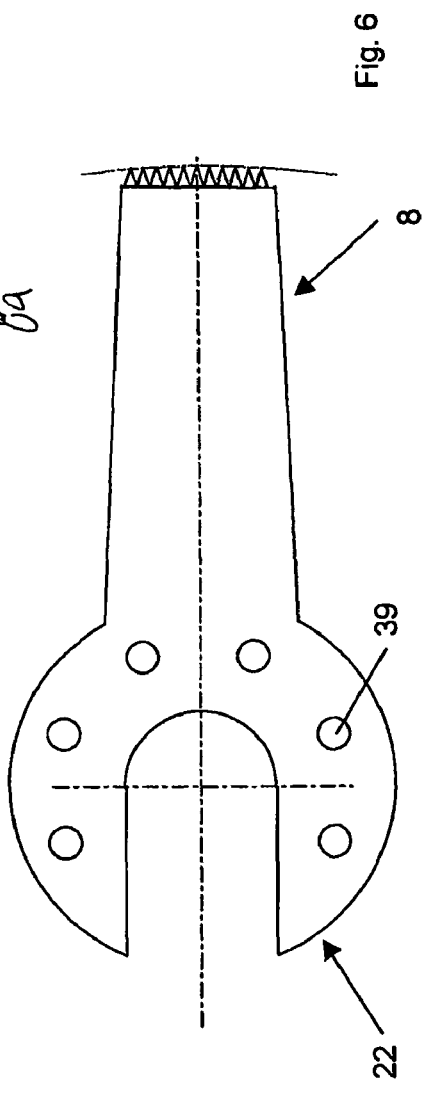
Fig. 4
Fig. 5
Fig. 6

US 7,784,166 B2

COUPLING DEVICE

CROSS REFERENCE TO RELATED APPLICATION

The present application is a continuation of International Application No. PCT/CH2003/000816 filed Dec. 15, 2003, the entire content of which is expressly incorporated herein by reference thereto.

FIELD OF THE INVENTION

A coupling device for connecting a tool to a driving mechanism and, in particular, a device which may have multiple engagement portions for engaging different types of tools.

BACKGROUND OF THE INVENTION

Saw blades are used by a surgeon to cut bones and/or tissue in the body as well as to remove items external the body such as casts. Rotatively oscillating surgical saw blades, such as mandibula, crescentic, sagittal or other surgical saw blades, preferably are rotatively and positively connected with a drive shaft because of the oscillating movement of the blades.

Existing coupling device such as the coupling device disclosed in U.S. Pat. No. 5,702,415 to Matthai et al. have locking means for detachably connecting a surgical saw blade and a driving device. The locking means comprise guiding pins, which are disposed parallel to the longitudinal axis of the drive shaft and can be introduced into openings in the saw blade so that the saw blade can be shifted transversely to the longitudinal axis and parallel to the contacting surface at the drive shaft. When the saw blade is centered, two pins, which are also disposed parallel to the longitudinal axis, engage the openings so that the saw blade is connected rotatively and positively with the drive shaft. Furthermore, a screw is disposed coaxially with and terminally at the drive shaft. As the screw is tightened, the head of the screw is pressed axially against the saw blade. In this way, the saw blade is fixed in the axial direction. Only saw blades, which have clamping segments of a particular type, can be accommodated in the coupling device.

It is desirable to have a coupling device which allows different saw blades with different clamping segments to be connected with the same drive shaft.

SUMMARY OF THE INVENTION

The coupling device for connecting a tool with a drive shaft may have a longitudinal axis; a first clamping device for connecting a first tool with the drive shaft, wherein the first clamping device may have a first locking device with a locked and unlocked position; a second clamping device for connecting a second tool with the drive shaft, wherein the second clamping device may have a second locking device with a locked and unlocked position; and an actuation mechanism which may be sized and configured such that movement of the actuation mechanism in a first direction may cause at least one of the first and second locking devices to be in the locked position and movement of the actuation mechanism in a second direction may cause at least one of the first and second locking devices to be in the unlocked position. The configuration of the coupling device may enable tools with different clamping segments to be connected to the drive shaft. For example, different tools, such as shaftless, flat saw blades with peripherally disposed saw teeth or bent saw blades with a clamping shaft and saw teeth disposed in arch-shaped fashion on the front, may be connected to a drive shaft by a single coupling device. At least one of the first and second tools may be a saw blade, for example, a mandible saw blade, a crescentic saw blade or a sagittal saw blade.

The actuation mechanism may be a sleeve which may be positioned about the shaft and moveable along the longitudinal axis from a first position where the first and second locking device may be in an unlocked position to a second position where the first and second locking devices may be in a locked position. The coupling device may also have a biasing member (e.g., a spring) positioned within the actuation mechanism and around the shaft. In particular, the sleeve may move in a first direction to cause at least one of the first and second locking devices to be in the locked position and may move in a second, opposite direction to cause at least one of the first and second locking devices to be in the unlocked position.

The first clamping device may be sized and configured to enable the first tool to be inserted into the coupling device in a direction which may be coaxial with the longitudinal axis. The first tool may have a clamping segment which may be peg-shaped. The clamping segment may have a groove. The first clamping device may have at least one ball which may be engageable the clamping segment. In one embodiment, the actuation mechanism may be a sleeve positioned about the shaft. The shaft may have a cavity and at least one borehole extending transverse to the longitudinal axis for receiving at least one ball. The clamping segment of the first tool may be positioned in the cavity of the shaft. The sleeve may be moved along the shaft so that at least a portion of at least one ball may move into the cavity and may be positioned within the groove of the clamping segment.

The first locking device may have a first seat for receiving a portion of the first tool. The first seat may have a cavity which may be sized and configured to engage a portion of the first tool so that the tool may be prevented from rotating relative to a front portion of the coupling device. The cavity may have at least one flat surface for engaging a corresponding surface of the first tool. In one embodiment, the cavity may be oval in shape.

The second clamping device may be sized and configured to enable the second tool to be inserted into the coupling device in a direction transverse to the longitudinal axis. The second clamping device may have at least one pin, wherein the pin may have a first free end for engaging a borehole in the sleeve and a second free end for engaging a borehole in a front portion of the coupling device. The second tool may have a flat clamping segment with at least one opening therethrough. The second clamping device may have a second seat and at least one pin positionable through the at least one opening of the clamping segment so that the second tool may be held on the second seat and prevented from moving relative to the shaft.

A method of engaging at least one tool to a drive shaft may comprise providing a coupling device having a longitudinal axis; a first clamping device for connecting a first tool with the drive shaft, wherein the first clamping device may have a first locking device with a locked and unlocked position; a second clamping device for connecting a second tool with the drive shaft, wherein the second clamping device may have a second locking device with a locked and unlocked position; and an actuation mechanism which may be sized and configured such that movement of the actuation mechanism may move at least one of the first and second clamping device between the locked and unlocked position. The method may further comprise engaging one of the first and second tools to the coupling device when at least one of the first and second clamping device is in an unlocked position; positioning one of the first and second tools against one of a first and second seat; and moving the actuation mechanism to cause the one of the first and second clamping device to move between the unlocked and locked position, thereby fixing one of the first and second tool relative to the drive shaft.

The first clamping device may have at least one ball and the actuation mechanism may be positioned about the shaft. The shaft may have a cavity and a borehole which may extend transverse to the longitudinal axis for receiving the at least one ball. The method may further comprise moving the actuation mechanism along the shaft to move at least a portion of the at least one ball into the cavity and engaging the at least one ball with a clamping segment of the first tool.

Moreover, the second tool may have a clamping segment with at least one opening therethrough and the second clamping device may have a second seat and at least one pin. The method may comprise positioning the at least one pin through the at least one opening to hold the second tool on the second seat and prevent the second tool from moving relative to the shaft; and moving the actuation mechanism from a first position to a second position, thereby moving the second clamping device from the unlocked to the locked position. Furthermore, the method may include moving the at least one pin into an opening of the front portion to fix the position of the second tool relative to the shaft.

BRIEF DESCRIPTION OF THE DRAWINGS

The coupling device can be better understood by reference to the following drawings, wherein like reference numerals represent like elements. The drawings are merely exemplary to illustrate certain features that may be used singularly or in combination with other features and the coupling device should not be limited to the embodiments shown.

FIG. 4 is a side view of an exemplary mandibula saw blade with a peg-shaped clamping segment;

FIG. 5 is a side view of an exemplary crescentic saw blade with a peg-shaped clamping segment; and FIG. 6 is a plan view of an exemplary sagittal saw blade with a flat U-shaped clamping segment.

DETAILED DESCRIPTION

Figure 1:
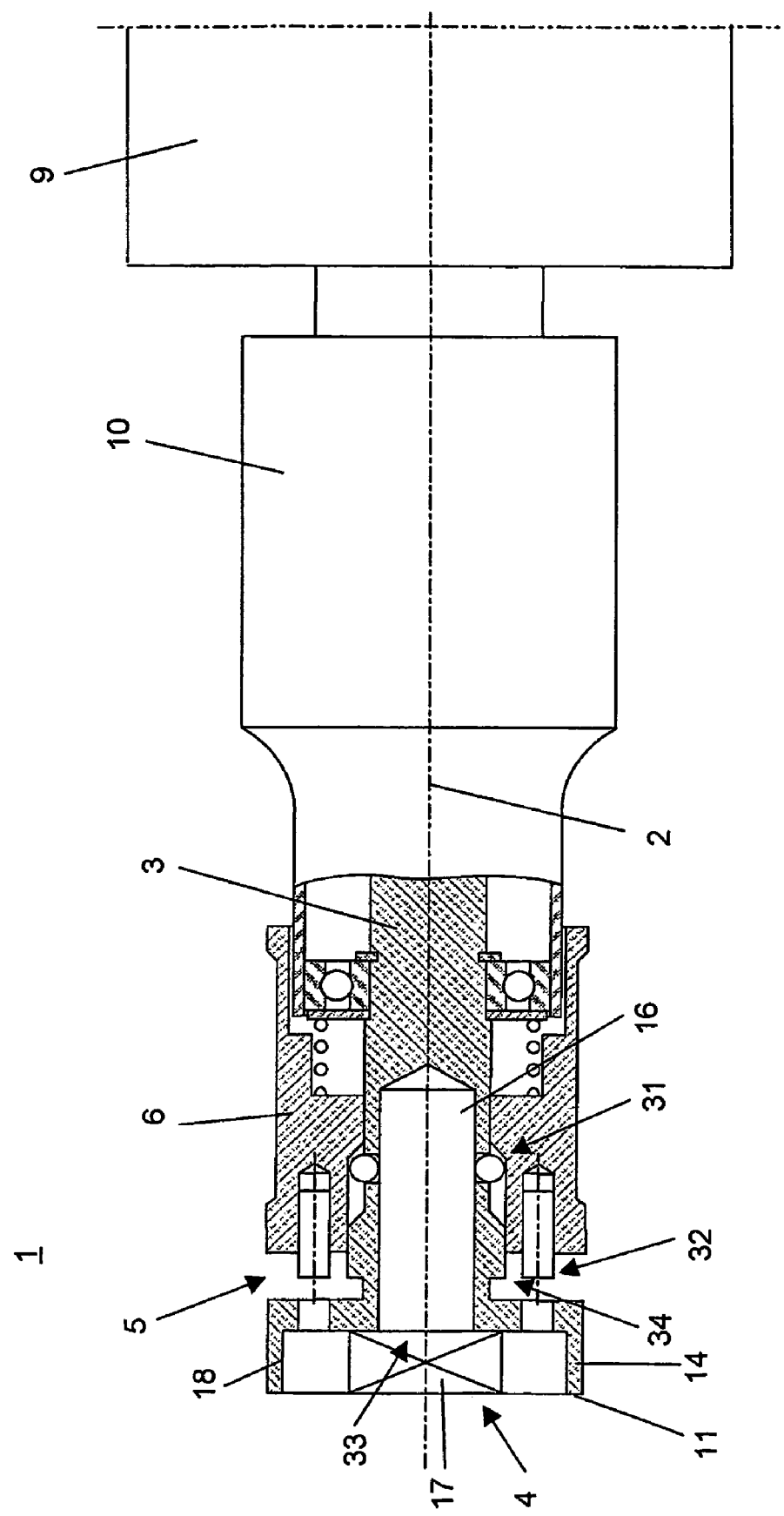
FIG. 1 is a partial cross-sectional view of an exemplary embodiment of the coupling device with clamping devices in a first, unlocking condition.

The coupling device 1 may have a first clamping device 4 including a first locking means 31 and a first seat 33 for receiving the clamping segment of a first tool. The coupling device 1 may also have a second clamping device 5 including a second locking means 32 and a second seat 34 for receiving the clamping segment of a second tool. It should, however, be understood that those of ordinary skill in the art will recognize many modifications and substitutions which may be made to various elements of the coupling device.

Figure 2:
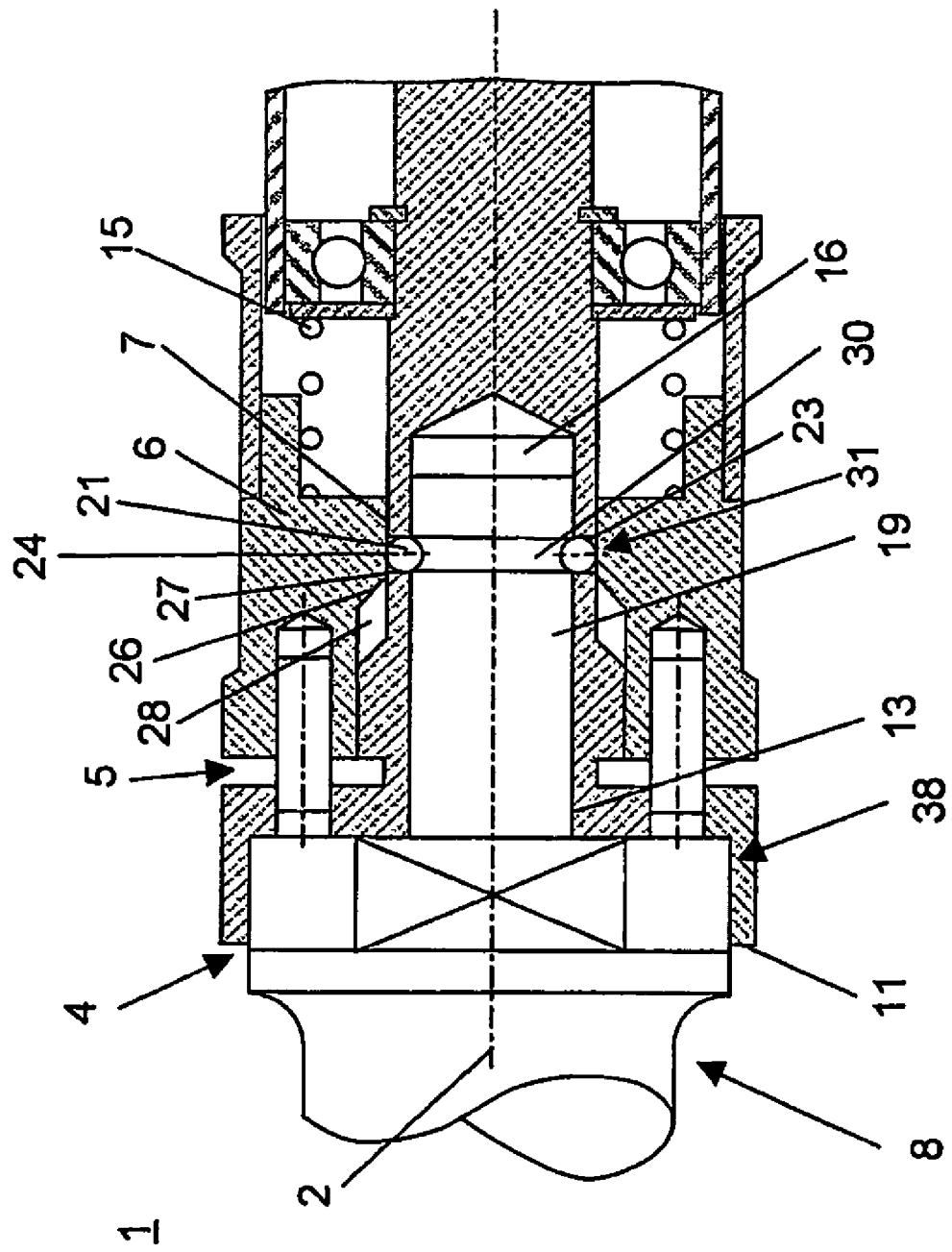
FIG. 2 is a cross-sectional view of the coupling device of FIG. 1 with clamping devices in a second, locked condition with a tool clamped in a first clamping device.
Figure 3:
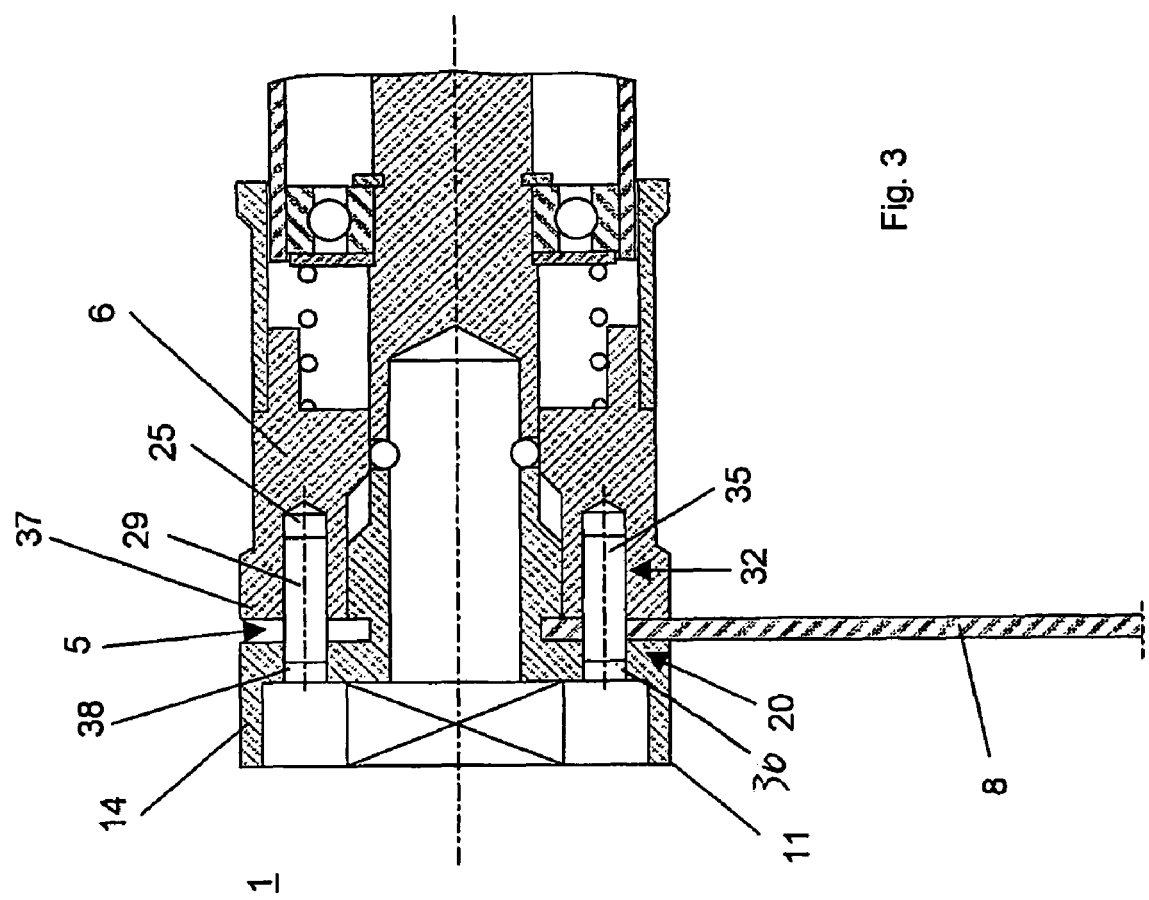
FIG. 3 is a cross-sectional view of the coupling device of FIG. 1 with clamping devices in a second, locked condition with an alternative tool clamped in a second clamping device.

As shown in FIGS. 1-3, the coupling device 1 may have a longitudinal axis 2, a first clamping device 4 for engaging various tools such as the tools 8 of FIGS. 4 and 5, and a second clamping device 5 for engaging various tools such as tool 8 of FIG. 6. The two clamping devices 4, 5 may be have different constructions. The coupling device 1 may be used to connect the clamped tool 8 to a drive shaft 3. The drive shaft 3 may be driven rotatively in an oscillating manner about the longitudinal axis 2 by means of a transmission 10 which may be disposed between the coupling device 1 and a driving motor 9.

In a preferred embodiments, the coupling device 1 may be configured to received saw blades. FIGS. 4, 5 and 6 illustrate exemplary saw blades. FIG. 4 shows a mandibula saw blade, FIG. 5 shows a crescentic saw blade and FIG. 6 shows a sagittal saw blade. The saw blades may be introduced into a first or second seat 33, 34 of the associated clamping device 4, 5, depending on the configuration of the clamping segment 19, 22, and may be fixed in position in the coupling device 1 by means of a first or a second locking means 31, 32 respectively. For example, the first clamping device 4 may have a first, coaxial seat 33 for a peg-shaped clamping segment 19 of the tools 8 of FIGS. 4 and 5. The second clamping device 5 may have a second seat 34 which may be disposed on the periphery of the coupling device 1. The second clamping device 5 may be sized and configured to receive a substantially flat clamping segment such as the flat, U-shaped clamping segment 22 of the tool 8 of FIG. 6.

The first clamping device 4 may have a first rotative driver 14 with a coaxial cavity 13 open at a free end 11 of the coupling device 1. The cavity 13 may accommodate the peg-shaped clamping segment 19 of a tool 8 so the axis of the tool 8 may be introduced coaxially with the longitudinal axis 2. The cavity 13 may have a cavity segment 33 with a non-circular or out-of-round cross-sectional area. The cavity 13 may be orthogonal to the longitudinal axis 2 and may be axially adjoining a circularly cylindrical central borehole 16. The external cavity segment 33 may consist of an oval opening with two parallel side surfaces 17 and two arc-shaped side surfaces 18, concentric within the longitudinal axis 2. In this way, a connection, positive with respect to rotation about the longitudinal axis 2, can be established between the first rotative driver 14 and a peg-shaped clamping segment 19 of a tool 8 of FIG. 4 or 5. It should be noted that the cavity segment 33 may be any shaped so long as the shape prevents the tool 8 from rotating relative to the driver 14. Moreover, a proximal portion 8a of the tool 8 may be any shape so long as the proximal portion 8a may engage the cavity segment 33 and prevent the tool 8 from rotating relative to the driver 14. For example, the segment 38 may have at least one flat side which may engage a corresponding flat side 17' of the tool 8. In another embodiment, the proximal portion 8a may have an oval shape and the cavity segment may have an oval shape.

The first locking means 31 of the first clamping device 4 may have at least one ball 21 and, in a preferred embodiment, may have two balls 21. The balls 21 may be carried in boreholes 23 which may have borehole axes 24 orthogonal to the longitudinal axis 2, so that the balls 21 may be shifted transversely with respect to the longitudinal axis 2. The balls 21 may be moved in the borehole 7 of a sleeve 6 which may be positioned on and moveably along the drive shaft 3. In particular, the balls 21 may be moved by the facets 26 at the inner ends 27 of a guiding groove 28 which may be parallel to the longitudinal axis 2. Depending on the axial position of the sleeve 6, the balls 21 may be locked in position or disengaged from an annular groove 30 at the peg-shaped clamping segment 19 of a tool, such as the tools 8 of FIGS. 4 and 5.

The first and in the second clamping device 4, 5 may be locked and unlocked by shifting a sleeve 6 along the axis 2. The sleeve 6 may be pressed towards the free end 11 of the coupling device 1 by means of a biasing member such as compression spring 15 (i.e., the sleeve may be biased towards a closed or locked position). The compression spring 15 may be disposed coaxially in a borehole 7 of the sleeve 6 and supported axially at the drive shaft 3 so that the sleeve 6 may be positioned against the free end 11 of the coupling device 1 and held in this front position. In this front position, both clamping devices 4, 5 may be locked. In such a position, the balls 21 of the first clamping device 4 may be pressed into an annular groove 30 at the peg-shaped clamping segment 19 of a tool 8. As a result a tool, such as tools 8 of FIG. 4 or 5, may be axially fixed in position. The boreholes 23 may be constricted at the inlet into the central borehole 15 so that the balls 21 do not fall out of the boreholes 23 when the peg-shaped connecting segment 19 of the tool 8 is disengaged from the borehole 16.

The second clamping device 5 may have a second rotative driver 20 with a second locking means 32 so that a tool can be introduced into the clamping device 5 in a direction substantially transverse to the longitudinal axis 2. The second locking means 32 may be disposed axially and set back from the free end 11 of the coupling device 1. This second locking means 32 may include at least one pin 29, the axis of which may be disposed on a circularly cylindrical circumferential surface which may be concentric with the longitudinal axis 2. The at least one pin 29 may be any shaped such as, for example, circular, elliptical or polygonal (e.g., rectangular, square). The locking means 32 may have one or more pins 29 with any shape so long as the pin(s) 29 prevent, for example, the tool 8 of FIG. 6 from rotating with respect to the shaft 3. In a preferred embodiment the locking means 32 may have a plurality of pins 29. The free ends 35 of the pins 29 may be pressed into boreholes 25 at the front end 37 of the sleeve 6. The pins 29 may be permanently or temporarily fixed in the boreholes 25 by, for example, adhesive, welding or press fitting. In some embodiments, the pins 29 may be integrally formed with the sleeve or the driver 14. The other end of the pins 29 may have free ends 36 which may engage aligned boreholes 38 at the first rotative driver 14 when the second locking means 32 is in the locked position. During the locking of the clamping device 5, the pins 29 may be pushed through complementary boreholes 39 of a flat, U-shaped clamping segment 22 of the tool 8 shown in FIG. 6. In this way, the tool 8 may be prevented from rotating (i.e., the tool may be connected rotatively positively) with respect to the drive shaft 3. Moreover, the flat, U-shaped clamping segment 22 of the tool 8 may be fixed in the axial direction between the first rotative driver 14 and the front end 37 of the sleeve 6.

FIG. 2 illustrates the coupling device 1 in the locked state with a clamped tool 8 (such as shown in FIGS. 4 and 5) having a peg-shaped clamping segment 19, which may be fixed in the first clamping device 4. The rotative drive 14 may transfer torque about the longitudinal axis 2 from the drive shaft 3 to the tool 8. A rotative, positive connection between the rotative driver 14 and the first clamping segment 19 of the tool 8 may be produced by means of the two parallel side surfaces 17, which may be disposed in the cavity segment 38 of the rotative driver 14 (i.e., the driver 14 may be preventing from rotating with respect to the tool 8). In one embodiment, the side surface 17 may be flat surfaces which may engage corresponding flat surfaces 17' of the peg-shaped clamping segment 19 of tool 8. Moreover, the first clamping segment 19 may be axially (positively) fixed within the first clamping device 4 by means of the balls 21 engaging the groove 30 which may peripherally disposed at the peg-shaped clamping segment 19 (i.e., the tool 8 may be prevented from moving axially with respect to the driver 14).

FIG. 3 illustrates the coupling device 1 in the locked state with a clamped tool 8 (such as shown in FIG. 6) having a flat U-shaped clamping segment 22, which may be fixed in the second clamping device 5.

Both locking devices 4 and 5 may be locked or unlocked simultaneously by shifting the same sleeve 6 along the axis 2. As shown in FIG. 1, the sleeve 6 which may be used to operate the two clamping devices 4, 5, is shown in a rear position. In this rear position, the two clamping devices 4, 5 may be in an unlocked position, so that a tool 8 with a peg-shaped clamping segment 19 may be introduced into the first clamping device 4 or a tool 8 with a flat U-shaped clamping segment 22 can be introduced into the second clamping device 5.

While the foregoing description and drawings represent the preferred embodiments of the coupling device, it will be understood that various additions, modifications and substitutions may be made therein without departing from the spirit and scope of the coupling device as defined in the accompanying claims. In particular, it will be clear to those skilled in the art that the coupling device may be embodied in other specific forms, structures, arrangements, proportions, and with other elements, materials, and components, without departing from the spirit or essential characteristics thereof. One skilled in the art will appreciate that the device may be used with many modifications of structure, arrangement, proportions, materials, and components and otherwise, used in the practice of the device, which are particularly adapted to specific environments and operative requirements without departing from the principles of the coupling device. The presently disclosed embodiments are therefore to be considered in all respects as illustrative and not restrictive, the scope of the device being indicated by the appended claims, and not limited to the foregoing description.

What is claimed is:

1. A coupling device having a longitudinal axis for connecting a tool with a drive shaft, the coupling device comprising:
    a first clamping device for connecting a first tool with the drive shaft, wherein the first clamping device has a first locking device with a locked and unlocked position;
    a second clamping device for connecting a second tool with the drive shaft, the second clamping device including a seat disposed around at least a portion of a periphery of the second clamping device to receive a portion of the second tool in a direction substantially transverse to and intersecting with the longitudinal axis, wherein the second clamping device has a second locking device with a locked and unlocked position; and
    an actuation mechanism sized and configured such that movement of the actuation mechanism in a first direction causes at least one of the first and second locking devices to be in the locked position and movement of the actuation mechanism in a second direction causes at least one of the first and second locking devices to be in the unlocked position,
    wherein the first clamping device comprises a rotative driver.

2. The coupling device of claim 1 wherein the first tool has a clamping segment.

3. The coupling device of claim 2, wherein the clamping segment is peg-shaped.

4. The coupling device of claim 2, wherein the first clamping device comprises at least one ball and the clamping segment comprises a groove for receiving the ball.

5. The coupling device of claim 4, wherein the actuation mechanism is a sleeve positioned about the shaft, wherein the shaft has a cavity and at least one borehole extending transverse to the longitudinal axis for receiving the at least one ball so that movement of the sleeve along the shaft causes at least a portion of the at least one ball to move into the cavity.

6. The coupling device of claim 4 further comprising a front portion, wherein the second clamping device comprises at least one pin, wherein the pin has a first free end for engaging a borehole in the sleeve and a second free end for engaging a borehole in the front portion.

7. The coupling device of claim 1, wherein the first locking device comprises a first seat for receiving a portion of the first tool.

8. The coupling device of claim 7 wherein the seat comprises a cavity which is sized and configured to engage a portion of the first tool so that the tool is prevented from rotating relative to the front portion.

9. The coupling device of claim 8, wherein the cavity has at least one flat surface for engaging a corresponding surface of the first tool.

10. The coupling device of claim 8, wherein the cavity is oval in shape.

11. The coupling device of claim 1, wherein the first clamping device is sized and configured to enable the first tool to be inserted into the coupling device in a direction coaxial with the longitudinal axis.

12. The coupling device of claim 11, wherein the second clamping device is sized and configured to enable the second tool to be inserted into the coupling device in a direction transverse to the longitudinal axis.

13. The coupling device of claim 1 further comprising a biasing member positioned within the actuation mechanism and around the shaft.

14. The coupling device of claim 13 wherein the biasing member is a spring.

15. The coupling device of claim 1, wherein at least one of the first and second tools is a saw blade selected from the group consisting of a mandible saw blade, a crescentic saw blade and a sagittal saw blade.

16. The coupling device of claim 1, wherein the actuation mechanism is a sleeve, the sleeve being positioned about the shaft and moveable along the longitudinal axis from a first position where the first and second locking device are in an unlocked position to a second position where the first and second locking devices are in a locked position.

17. The coupling device of claim 1, wherein the second tool has a flat clamping segment with at least one opening therethrough, the second clamping device having a second seat and at least one pin positionable through the at least one opening to hold the second tool on the second seat and prevent the second tool from moving relative to the shaft.

18. A coupling device having a longitudinal axis for connecting a tool with a drive shaft, the coupling device comprising:
a first clamping device for connecting a first tool with the drive shaft, wherein the first clamping device has a first locking device with a locked and unlocked position;
a second clamping device for connecting a second tool with the drive shaft, the second clamping device including a seat disposed around at least a portion of a periphery of the second clamping device to receive a portion of the second tool in a direction substantially transverse to and intersecting with the longitudinal axis, wherein the second clamping device has a second locking device with a locked and unlocked position;
a sleeve moveable along the longitudinal axis, wherein movement of the sleeve in a first direction causes at least one of the first and second locking devices to be in the locked position and wherein movement of the sleeve in a second, opposite direction along cause at least one of the first and second locking devices to be in the unlocked position,
wherein the first clamping device comprises a rotative driver.

19. The coupling device of claim 18, wherein the first tool is has a peg-shaped clamping segment.

20. The coupling device of claim 19, wherein the second tool has a flat clamping segment with at least one opening therethrough, the second clamping device having a second seat and at least one pin positionable through the at least one opening to hold the second tool on the second seat and prevent the second tool from moving relative to the drive shaft.

21. The coupling device of claim 18, wherein the first clamping device comprises at least one ball, wherein the first tool has a clamping segment with a groove for receiving the ball.

22. The coupling device of claim 21, wherein the sleeve is positioned about the shaft, the shaft having a cavity and a borehole extending transverse to the longitudinal axis for receiving the at least one ball so that movement of the sleeve along the shaft causes at least a portion of the at least one ball to move into the cavity.

23. The coupling device of claim 18 further comprising a front portion, wherein the second clamping device comprises at least one pin, wherein the pin has a first free end for engaging a borehole in the sleeve and a second free end for engaging a borehole in the front portion.

24. The coupling device of claim 18, wherein the first locking device comprises a first seat for receiving a portion of the first tool.

25. The coupling device of claim 24 wherein the seat comprises a cavity which is sized and configured to engage a portion of the first tool so that the tool is prevented from rotating relative to the front portion.

26. A method of engaging at least one tool to a drive shaft comprising:
providing a coupling device comprising:
a first clamping device for connecting a first tool with the drive shaft, wherein the first clamping device has a first locking device with a locked and unlocked position and comprises a rotative driver;
a second clamping device for connecting a second tool with the drive shaft, the second clamping device including a seat disposed around at least a portion of a periphery of the second clamping device to receive a portion of the second tool in a direction substantially transverse to and intersecting with a longitudinal axis of the coupling device, wherein the second clamping device has a second locking device with a locked and unlocked position; and
an actuation mechanism sized and configured such that movement of the actuation mechanism moves at least one of the first and second clamping device between the locked and unlocked position, wherein the coupling device engages the drive shaft;
engaging one of the first and second tools to the coupling device when at least one of the first and second clamping device is in an unlocked position;
positioning one of the first and second tools against one of a first and second seat; and
moving the actuation mechanism to cause the one of the first and second clamping device to move between the unlocked and locked position, thereby fixing one of the first and second tool relative to the drive shaft.

27. The method of claim 26 wherein the first clamping device comprises at least one ball and wherein the actuation mechanism is positioned about the shaft, the shaft having a cavity and a borehole extending transverse to a longitudinal axis of the coupling device for receiving the at least one ball, the method further comprising:

moving the actuation mechanism along the shaft to move at least a portion of the at least one ball into the cavity; and engaging the at least one ball with a clamping segment of the first tool.

28. The method of claim 26, wherein the second tool has a clamping segment with at least one opening therethrough and wherein the second clamping device has a second seat and at least one pin, the method further comprising:

positioning the at least one pin through the at least one opening to hold the second tool on the second seat and prevent the second tool from moving relative to the shaft; and moving the actuation mechanism from a first position to a second position, thereby moving the second clamping device from the unlocked to the locked position.

29. The method of claim 28, wherein the coupling device has a front portion with an opening therein, the method further comprises moving the at least one pin into the opening to fix the position of the second tool relative to the shaft.

\* \* \* \* \*

UNITED STATES PATENT AND TRADEMARK OFFICE
CERTIFICATE OF CORRECTION

PATENT NO.      : 7,784,166 B2                                    Page 1 of 1
APPLICATION NO. : 11/453583
DATED           : August 31, 2010
INVENTOR(S)     : Tanner It is certified that error appears in the above-identified patent and that said Letters Patent is hereby corrected as shown below:

Col. 8, lines 6-7
Claim 19 should be as follows:

-- Claim 19. The coupling device of claim 18, wherein the first tool [[is]] has a peg-shaped clamping segment. --

Signed and Sealed this

Ninth Day of November, 2010

David J. Kappos
*Director of the United States Patent and Trademark Office*